United States Patent Office 3,772,402
Patented Nov. 13, 1973

3,772,402
CURING ABC TERPOLYMERS
Ollie G. Buck and Henry L. Hsieh, Bartlesville, Okla., assignors to Phillips Petroleum Company
No Drawing. Continuation-in-part of abandoned application Ser. No. 11,919, Feb. 16, 1970. This application Nov. 29, 1971, Ser. No. 203,065
Int. Cl. C08g 30/12, 33/00
U.S. Cl. 260—830 R                    4 Claims

ABSTRACT OF THE DISCLOSURE

ABC terpolymers having hydroxyl and/or carboxyl groups therein are cured with polyfunctional compounds capable of reacting with hydroxyl and/or carboxyl functional groups.

---

This application is a continuation-in-part of application Ser. No. 11,919 filed Feb. 16, 1970 now abandoned.

This invention relates to a process of curing ABC terpolymers. In another aspect, this invention relates to cured ABC terpolymers.

The term "ABC terpolymer" as herein used designates a polymeric product in which three different types of monomers are present in the polymer molecule. These three different monomers appear in the polymer in an essentially regular repeating fashion, that is, in an essentially recurring sequence such as —ABCABCABC— where A, B and C each represents a different type of monomer.

It now has been found that ABC terpolymers as herein defined can be cured by reaction with polyfunctional compounds selected from the group consisting of polyfunctional epoxides, polyisocyanates and aziridinyl compounds. The curing process of this invention can be employed to convert liquid or low molecular weight ABC terpolymers to resinous or rubbery products of higher molecular weight or to transform normally solid ABC terpolymers to insoluble or infusible resins.

Curing, as used in this application, is defined to mean chain extending, crosslinking, or interchain grafting.

Accordingly, an object of this invention is to provide a process for curing ABC terpolymers. Another object of this invention is to provide a cured ABC terpolymer.

Other objects, aspects and advantages of this invention will be apparent to one skilled in the art from the following disclosure and appended claims.

The ABC terpolymer is a product formed on polymerizing an oxirane, a cyclic acid anhydride and a 1,3-epoxide or 1,4-epoxide. One method of producing such a terpolymer comprises charging a reactor first with anhydride, then with the epoxide, then with the oxirane; adding polymerization catalyst which is an organometallic compound; terminating the polymerization after a desired length of time by the addition of a catalyst inactivating agent, such as isopropyl alcohol; and separating and drying the resulting product by conventional means.

The composition ranges of the monomers in the ABC terpolymer can be conveniently expressed in terms of the molar ratio of two of the monomers to the third monomer. The mole ratio of the oxirane to the cyclic acid anhydride ranges from 0.6/1 to 1.4/1, preferably from 0.8/1 to 1.2/1. The mole ratio of the epoxide to the cyclic acid anhydride ranges from 0.1/1 to 1/1, preferably from 0.5/1 to 1/1. The monomers of each type can also combine in essentially equimolar ratios in recurring sequence, i.e., 1/1/1.

Although the monomers can be present in the ABC terpolymer in essentially equimolar proportions, the mole ratio of the monomers can be varied and the amount of ABC terpolymer thus obtained is determined in some instances by the monomer present in the least amount. In a preferred method of preparing these ABC terpolymers, an excess amount of epoxide monomer is used in the reaction mixture, as the epoxide can also serve as a diluent for the reaction mixture.

All of the epoxide that is polymerized reacts in such a manner that it forms a terpolymer unit with ABC structure with the oxirane and the cyclic acid anhydride. Excess amounts of oxirane and cyclic acid anhydride appear in random fashion throughout the terpolymer or, if little or no epoxide is present, copolymerize with each other until one of these two monomers is exhausted.

In this ABC terpolymer, at least 10 weight percent of the polymer has this ABC structure, preferably at least 50 weight percent, in order to obtain the advantages of the ABC structure.

Oxiranes employed in the making of this ABC terpolymer can be saturated, unsaturated, or a mixture thereof. Oxiranes containing up to and including 20 carbon atoms per molecule can be used in the formation of the terpolymer. Oxiranes which can be polymerized in accordance with this invention can be represented by the following formula:

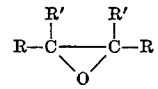

wherein each R and R' is selected from the group consisting of hydrogen, saturated aliphatic, saturated cycloaliphatic, monoolefinic aliphatic, diolefinic aliphatic, monoolefinic cycloaliphatic, diolefinic cycloaliphatic and aromatic radicals, and combinations of these such as aralkyl, alkaryl, and the like. Some or all of the R and R' radicals can also be halogen-substituted and can contain oxygen in the form of an acyclic ether linkage (—O—) or an oxirane group

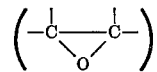

Further, the oxirane represented by the above formula can contain one or two olefinic linkages, one or two oxirane groups and up to one acyclic ether linkage. In addition, both R' radicals can represent a divalent aliphatic hydrocarbon radical which, together with the carbon atoms of the oxirane group, can form a cycloaliphatic hydrocarbon nucleus containing from about 4 to about 10 carbon atoms, preferably from about 4 to about 8 carbon atoms.

Specific examples of some of the oxiranes which are within the above structural formula and which can be homopolymerized of copolymerized in accordance with the invention are ethylene oxide (epoxy ethane);
1,2-epoxypropane (propylene oxide);
1,2-epoxybutane;
2,3-epoxybutane;
2,3-epoxypentane;
1,2-epoxyhexane;
3,4-epoxyhexane;
1,2-epoxyheptane;
2,3-epoxyoctane;
2,3-dimethyl-2,3-epoxypentane;
1,2-epoxy-4-methylpentane;
2,3-epoxy-5-methylhexane;
1,2-epoxy-4,4-dimethylpentane;
4,5-epoxyeicosane;
1-chloro-2,3-epoxypropane (epichlorohydrin);
1-bromo-2,3-epoxypropane;
1,5-dichloro-2,3-epoxypentane;
2-iodo-3,4-epoxybutane;
styrene oxide;

6-oxybicyclo[3.1.0]hexane;
7-oxybicyclo[4.1.0]heptane;
3-propyl-7-oxybicyclo[4.1.0]heptane;
bis(2,3-epoxybutyl)ether;
tert-butyl 4,5-epoxyhexyl ether;
2-phenylethyl 3,4-epoxybutyl ether and the like.

Unsaturated oxiranes within the above structural formula, including ethers, which can be homopolymerized or copolymerized in accordance with this invention include allyl 2,3-epoxypropyl ether (allyl glycidyl ether);
allyl 3,4-epoxybutyl ether;
1-methallyl 3,4-epoxyhexyl ether;
3-hexenyl 5,6-epoxyhexyl ether;
2,6-octadienyl 2,3,7,8-diepoxyoctyl ether;
6-phenyl-3-hexenyl 3-ethyl-5,6-epoxyhexyl ether;
3,4-epoxy-1-butene (butadiene monoxide);
3,4-epoxy-1-pentene;
5-phenyl-3,4-epoxy-1-pentene;
1,2,9,10-diepoxy-5-decene;
6,7-di-n-butyl-3,4,9,10-diepoxy-1,11-dodecadiene;
epoxy vinyl ether;
allyl 2-methyl-2,3-epoxypropyl ether;
3-cyclohexyl-2-propenyl 4-cyclohexyl-3,4-epoxybutyl ether;
2,4-pentadienyl 2,3-diethyl-3,4-epoxybutyl ether;
1-methallyl 6-phenyl-3,4-epoxyhexyl ether;
5-(4-tolyl)2,3-epoxypentyl vinyl ether;
bis[4-(3-cyclopentenyl)2,3-epoxybutyl]ether;
2-(2,4-cyclohexadienyl)ethyl 2,3-epoxybutyl ether;
2-(2,5-cyclohexadienyl)ethyl 2-benzyl-4,5-epoxypentyl ether;
3,4-epoxy-1,5-hexadienyl isopropyl ether;
allyl 3,4-dimethyl-3,4-epoxyhexyl ether;
3,4-epoxy-4-(2,3-dimethylphenyl)1-butene;
3,4-dimethyl-3,4-epoxy-1-pentene;
5-(4-methylcyclohexyl)3,4-epoxy-1-pentene;
4,5-diethyl-4,5-epoxy-2,6-octadiene;
4-(2,4-cyclopentadienyl)1,2,6,7-diepoxyheptane; and
1-phenyl-1,2-epoxy-5,7-octadiene, and the like.

The second type of monomer contained in the ABC terpolymer is a cyclic acid anhydride (cyclic carboxylic acid anhydride). This monomer can be saturated or unsaturated and can contain substituents such as allyl, alkenyl, alkoxy, nitro, halo, and the like. Examples of such anhydrides include malonic anhydride, succinic anhydride, glutaric anhydride, adipic anhydride, pimelic anhydride, glutaconic anhydride, maleic anhydride, phthalic anhydride, tetrachlorophthalic anhydride, 3-nitrophthalic anhydride, allylsuccinic anhydride, pyromellitic dianhydride, 1,4,5,6,7,7 - hexachloro - endo - cis - bicyclo[2,2,1] - 5-heptene - 2,3 - dicarboxylic anhydride, and endo-cis-bicyclo[2,2,1] - 5 - heptene - 2,3 - dicarboxylic anhydride, and the like. Mixtures of these compounds, saturated, unsaturated, or both, can be used.

If either the oxirane, the cyclic acid anhydride, or both monomers contain carbon-carbon double bonds, the resulting ABC terpolymer will also contain carbon-carbon double bonds.

The third type of monomer used in preparing the ABC terpolymer is a compound selected from the group comprising 1,3- or 1,4-epoxides. Examples of such epoxides are trimethylene oxide (oxetane), bis(chloromethyl) oxetane, tetramethylene oxide (tetrahydrofuran), and the like.

The organometallic compound used in preparing the ABC terpolymer can be represented by the formula $$R'''_n M X_m$$

wherein each R''' is a saturated aliphatic, a saturated cycloaliphatic hydrocarbon radical, or a combination thereof containing from 1 to 20 carbon atoms; M is calcium, magnesium, zinc, cadmium, aluminum, gallium, indium, thallium, silicon, or tin; X is hydrogen, fluorine, chlorine, bromine, iodine or OR'''; n is an integer from 1 to 4; m is an integer from 0 to 3; and n and m equal the valence of the metal M. An optional cocatalyst can be used with the organometallic compound in preparing the ABC terpolymer. The mole ratio of optional cocatalyst to organometallic compound is in the range of 0.001/1 to 1/1, preferably 0.2/1 to 0.5/1. Specific examples of the optional cocatalysts are water, alcohols, or a complexing agent such as a beta-diketone or a metal salt thereof, such as zinc acetylacetonate.

In the preparation of the ABC terpolymer, there can be numerous variations in the charging procedure. Usually the cyclic acid anhydride is charged first. Then the diluent can be added, followed by the remaining monomers, i.e., the epoxide and oxirane. Finally, the catalyst is added with the organometallic compound generally added before the cocatalyst. The polymerization is conducted in an inert atmosphere such as nitrogen. The diluent employed as a reaction medium can be hydrocarbon such as aliphatic, cycloaliphatic, aromatic compounds and mixtures thereof. A liquid monomer or a mixture of liquid monomers can be used instead of or in admixture with one or more hydrocarbon diluents.

The polymerization is conducted at temperatures ranging from —100° F. to 300° F., preferably from 30° F. to 200° F. The time for polymerization depends upon the temperature and ranges from less than 1 minute to more than 10 days, preferably from 10 minutes to 50 hours. The polymerization reaction can be terminated by any suitable method conventionally used to inactivate organometallic catalyst, such as by the addition of an alcohol such as isopropyl alcohol, and the terpolymer then can be separated and dried.

The reaction mixture should be maintained substantially completely in the liquid phase, and the pressure should be sufficiently high to achieve this result.

ABC terpolymers such as those of tetrahydrofuran, ethylene oxide, and phthalic anhydride prepared according to this invention can be conveniently analyzed by nuclear magnetic resonance (NMR). A regularly repeating unit of this ABC terpolymer can be written as follows:

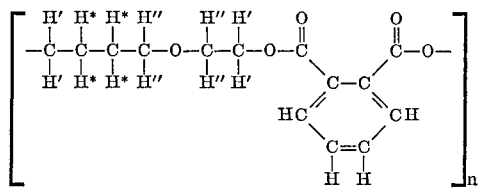

wherein n is the number of repeating units in a polymer molecule and wherein the hydrogens are marked for convenience in identifying those whose chemical environments are alike. It can be seen from the above formula that said repeating unit contains a total of 16 hydrogens and that said 16 hydrogens are equally divided among four different types in terms of chemical environment, i.e., there are four each of the hydrogen H, H', H'', and H*. NMR analysis of such a 1/1/1 mole ratio terpolymer would then reveal four peaks of equal intensity. Hydrogens of the type H' should show resonance in the region of 5.3–5.9 tau ($\tau$); H* type in the region 8.0–8.7 $\tau$; H'' type in the region 6.1–6.7 $\tau$, and H type (aromatic) in the region 2.1–2.7 $\tau$. Such regions are easily resolvable for the required NMR analysis. No other arrangement of the individual monomers in said terpolymer can give rise to this type of NMR spectrum. Furthermore, the relative intensities of the various peaks in the NMR spectra of ABC terpolymers made at mole ratios other than 1/1/1 provide a simple and rapid analysis of the monomer mole ratios in such terpolymers. The amount of (H' and H'') in the epoxide is equal to the amount of H* in the epoxide; therefore, the intensity ratio of $$H/2H^*/(H'+H'')-H^*$$

is the same as the monomer ratio of cyclic acid anhydride/ epoxide/oxirane.

The ABC terpolymers contain hydroxyl (—OH) and carboxyl (—$CO_2H$) groups and are cured in accordance with this invention, as indicated previously, by reaction with polyfunctional compounds capable of reacting with the hydroxyl and/or carboxyl groups, i.e., a polyfunctional epoxide, polyisocyanate or aziridinyl compound.

The polyisocyanates which can be employed in the process of the invention include compounds containing two or more —N=C=O groups. These polyisocyanates can be aliphatic, cycloaliphatic or aromatic compounds. Preferably the polyisocyanates are represented by the general formula $R(NCO)_m$ wherein R is a polyvalent organic radical containing from 2 to 30 carbon atoms, and $m$ is the integer 2, 3, or 4. R can be aliphatic, cycloaliphatic or aromatic. Also, it is preferred that the organic radical be essentially hydrocarbon in character although the presence of unreactive groups containing elements other than carbon and hydrogen is permissible.

Specific examples of polyisocyanates that can be employed in the process of this invention are:

benzene-1,3-diisocyanate
benzene-1,4-diisocyanate
hexane-1,6-diisocyanate
toluene-2,4-diisocyanate (tolylene-2,4-diisocyanate)
toluene-3,4-diisocyanate
diphenylmethane-4,4'-diisocyanate
naphthalene-1,5-diisocyanate
diphenyl-4,4'-diisocyanate
diphenyl-3,3'-dimethyl-4,4'-diisocyanate
diphenyl-3,3'-dimethoxy-4,4'-diisocyanate
2,2'-diisocyanate diethylether
3-(diethylamino)pentane-1,5-diisocyanate
pentane-1,5-diisocyanate
butane-1,4-diisocyanate
octane-1,8-diisocyanate
ethane diisocyanate
propane-1,2-diisocyanate
cyclohex-4-ene-1,2-diisocyanate
xylylene-1,4-diisocyanate
benzene-1,2,4-triisocyanate
naphthalene-1,3,5,7-tetraisocyanate
triphenylmethane triisocyanate
naphthalene-1,3,7-triisocyanate, and the like.

A suitable commercially available polyaryl polyisocyanate is PAPI 1, a product of Corwin Chemical Company. This material has an average of 3 isocyanate groups per molecule and an average molecular weight of about 380. Its general formula is

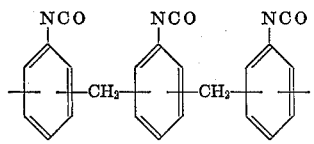

The triaziridinyl phosphine oxides or sulfides that can be employed in the process of this invention are represented by the formula

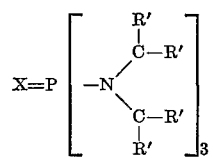

wherein X is oxygen or sulfur and each R' is hydrogen or alkyl, cycloalkyl or aryl, or combinations thereof such as alkylaryl, arylalkyl, and the like, and the total R' groups of each aziridinyl group ranges up to 20 carbon atoms.

Specific phosphine oxide and sulfide reactants which can be employed in the process of this invention are:

tri(1-aziridinyl)phosphine oxide
tri(2-methyl-1-aziridinyl)phosphine oxide
tri(2,2-dimethyl-1-aziridinyl)phosphine oxide
tri(2-methyl-3-ethyl-1-aziridinyl)phosphine oxide
tri(2-ethyl-3-decyl-1-aziridinyl)phosphine oxide
tri(2-eicosyl-1-aziridinyl)phosphine oxide
tri(2-methyl-3-cyclopentyl-1-aziridinyl)phosphine oxide
tri(2-phenyl-1-aziridinyl)phosphine oxide
tri[2-ethyl-3-(1-naphthyl)1-aziridinyl]phosphine oxide
tri(2-nonyl-3-benzyl-1-aziridinyl)phosphine oxide
tri[t-ethyl-3-(1-naphthyl)-1-aziridinyl]phosphine oxide
tri[2-heptyl-3-(2,4-dimethylphenyl)1-aziridinyl] phosphine oxide
tri(2-methyl-1-aziridinyl)phosphine sulfide
tri(2-methyl-3-cyclohexyl-1-aziridinyl)phosphine sulfide
tri(2-phenyl-1-aziridinyl)phosphine sulfide
tri(2-amyl-3-benzyl-1-aziridinyl)phosphine sulfide and the like.

Examples of other polyfunctional aziridinyl compounds are the aziridinyl-substituted triazines and triphosphatriazines, for example the 1-aziridinyl-1,3,5-triazines and the 1-aziridinyl-2,4,6-triphospha-1,3,5-triazines represented by the formulas

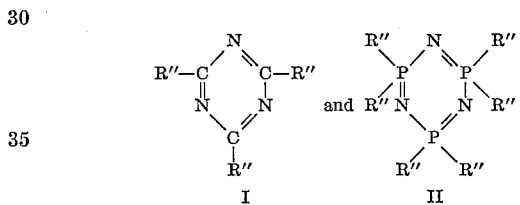

wherein each R'' is a radical at least two of which in each formula are 1-aziridinyl radicals as defined above for the phosphine oxides and sulfides and the remainder are said 1-aziridinyl radicals, hydrogen, alkyl, cycloalkyl or aryl radicals or combinations thereof, each hydrogen radical having from 1 to 12 carbon atoms.

Examples of compounds represented by Formula I include the following:

2,4-di(1-aziridinyl)1,3,5-triazine
2-methyl-4,6-di(1-aziridinyl)1,3,5-triazine
2,4,6-tri(1-aziridinyl)1,3,5-triazine
2,4,6-tri(2-methyl-1-aziridinyl)1,3,5-triazine
2,4,6-tri(2-methyl-3-ethyl-1-aziridinyl)1,3,5-triazine
2,4,6-tri(2-methyl-3-octadecyl-1-aziridinyl)1,3,5-triazine
2,4,6-tri(2-methyl-3-cyclopentyl-1-aziridinyl)1,3,5-triazine
2,4,6-tri(2-phenyl-1-aziridinyl)1,3,5-triazine
2,4,6-tri(2,3-diphenyl-1-aziridinyl)1,3,5-triazine
2,4,6-tri[2-n-propyl-3-(2-phenylethyl)1-aziridinyl] 1,3,5-triazine
2,4,6-tri[2-methyl-3-(4-methylphenyl)-1-aziridinyl] 1,3,5-triazine and the like.

Examples of compounds represented by Formula II are:

2,4-di(1-aziridinyl)2,4,6-triphospha-1,3,5-triazine
2,4,6-tri(1-aziridinyl)2,4,6-triphospha-1,3,5-triazine
2,4,6-tri(2-methyl-3-n-butyl-1-aziridinyl)2,4,6-triphospha-1,3,5-triazine
2,4,6-tri-(2-ethyl-3-cyclohexyl-1-aziridinyl)2,4,6-triphospha-1,3,5-triazine
2,4,6-tri[2-n-propyl-3-(2-phenylethyl)1-aziridinyl]2,4,6-triphospha-1,3,5-triazine
2,4,6-tri[2-heptyl-3-(2,4-dimethylphenyl)1-aziridinyl]2,4,6-triphospha-1,3,5-triazine 2,2,4,4,6,6-hexa(2-methyl-1-aziridinyl)2,4,6-triphospha-1,3,5-triazine, hereinafter referred to as hexa-2-methyl-1-aziridinyl-triphospha-triazine
2,2,4,6-tetra(2-hexyl-1-aziridinyl)2,4,6-triphosphat-1,3,5-triazine
and the like.

Other difunctional aziridinyl compounds which can be employed are defined by the formula

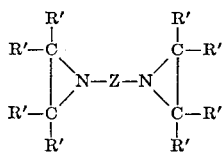

wherein Z is carbonyl, phenyl phosphoryl, phenyl thiophosphoryl, sulfoxyl or sulfonyl and each R' is as defined above for the aziridinyl radical of the phosphine oxides. In a preferred species Z is phenyl phosphoryl or sulfoxyl attached to (2-methyl-1-aziridinyl) groups. Examples of these difunctional aziridinyl compounds are:

phenyl-bis(2-methyl-1-aziridinyl)phosphine sulfide
phenyl-bis(2-methyl-1-aziridinyl)phosphine oxide
phenyl-bis(2-ethyl-1-aziridinyl)phosphine oxide
phenyl-bis(2-methyl-3-ethyl-1-aziridinyl)phosphine oxide
phenyl-bis(2-butyl-1-aziridinyl)phosphine oxide
bis(2-methyl-1-aziridinyl)sulfoxide
bis(2-methyl-3-propyl-1-aziridinyl)sulfoxide
(2-methyl-1-aziridinyl-2-butyl-1-aziridinyl)sulfoxide
bis(1-aziridinyl)sulfone
bis(2-methyl-1-aziridinyl)sulfone
bis(2-propyl-1-aziridinyl)sulfone
bis(2-ethyl-1-aziridinyl)sulfone
bis(2-propyl-1-aziridinyl)sulfone
bis(2-ethyl-3-propyl-1-aziridinyl)sulfone
(2-methyl-1-aziridinyl-2-ethyl-1-aziridinyl)sulfone
bis(1,2-propylene)-1,3-urea
bis(1,2-pentylene)-1,3-urea
bis(4,5-octylene)-1,3-urea and the like.

Suitable polyfunctional epoxides include those containing at least 2 epoxide

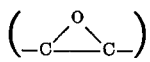

groups per mole. Examples would include: 1,2;5,6-diepoxyhexane; 2,3;6,7;11,12-triepoxydodecane; 2,3,5-triepoxyethyl-9,10-epoxyhexadecane; 1,2;5,6 - diepoxycyclododecane; and the like. Particularly useful compounds of this class include liquid epoxidized polybutadiene containing three or more epoxy groups per molecule and an epoxidized linseed oil containing about five epoxy groups per molecule.

The amount of polyfunctional curing agent employed in the process of this invention is generally in the range of 1.0 to 1.5 equivalents of reactive group in the curative per equivalent of hydroxyl and/or carboxyl group in the ABC terpolymer.

The temperature employed in the curing process can vary over a wide range. It is generally in the range of 70° to 500° F., preferably in the range from 200° to 300° F. The time employed also can vary over a wide range and is generally dependent upon the amount and the reactivity of the curative employed and on the temperature used. Normally the time is in the range of 1 minute to 100 hours, preferably 0.5 to 50 hours.

It is within the scope of this invention to add fillers such as carbon black, clay, or silica, stabilizers, pigments, extenders and plasticizers such as are commonly employed in compounding plastics or elastomers.

The polymeric cured products of this invention are suitable for use as sealants, caulking compounds, adhesives, gaskets, potting compounds for electrical components, and the like. They have outstanding utility in applications requiring solvent resistance in materials of the type listed above.

The advantages of this invention are further illustrated by the following example. The reactants and proportions and other specific conditions are presented as being typical and should not be construed to limit the invention unduly.

EXAMPLE

An ABC terpolymer of phthalic anhydride, epichlorohydrin, and tetrahydrofuran was prepared according to the recipe shown below.

POLYMERIZATION RECIPE

|  | Amount |
|---|---|
| Phthalic anhydride, moles | 0.3 |
| Epichlorohydrin, moles | 0.3 |
| Tetrahydrofuran, ml. | 125 |
| Triisobutylaluminum, mmoles | 37.5 |
| Temperature, ° F. | 158 |
| Time, hours | 17 |

In this run, the phthalic anhydride was weighed into the reactor first, followed by the tetrahydrofuran, after which the reactor was closed and pressured with nitrogen. Epichlorohydrin was added next, followed by the triisobutylaluminum and the temperature adjusted to the desired level. At the end of the polymerization period the polymerization reaction was terminated with a dilute solution of HCl in isopropyl alcohol. The polymer was recovered by evaporation of the liquids and the product polymer washed until neutral. The polymer had the following properties:

| | |
|---|---|
| —CO$_2$H[a], wt. percent | 0.99 |
| —OH[a], wt. percent | 0.87 |
| I.V.[b] | 0.10 |
| Gel[b], wt. percent | 0 |
| M.W.[c] | 6300 |

[a] The total active hydrogen content was determined by gas chromatographic analysis of the amount of hydrogen liberated in a titration of a known amount of the polymer employing LiAlH$_4$ as the titrant. The total —CO$_2$H content was then determined to a modification of the method of Fritz and Lisicki in Analytical Chemistry 23, 589 (1951), by titration of a known amount of polymer with sodium methoxide in pyridine. The —OH content was then determined by the difference between the total active hydrogen content and the —CO$_2$H content.
[b] Determined according to the procedures of U.S. 3,278,508, column 20, notes a and b, except that tetrahydrofuran was employed as the solvent for the polymer rather than toluene.
[c] Approximate number average molecular weight.

This ABC polymer was then treated according to the procedure of this invention with various curatives. The results are shown in the table below:

| | | | | | Product | |
|---|---|---|---|---|---|---|
| Run No. | Polymer, grams | Curative, type (meq.) | Temp., ° F. | Time, min. | I.V. | Gel, percent |
| 1 | 10 | Resin 332[a] (2.44) | 212 | 60–120 | 0.28 | 0 |
| 2 | 10 | MAPO[b] (2.44) | 212 | 75 | 0.14 | 0 |
| 3 | 10 | HMAT[c] (3.66) | 212 | 3 | | 94 |

[a] A purified epoxy resin supplied by Dow Chemical Company having an epoxy equivalent weight of 172–176 and a molecular weight of about 380.
[b] Tri(2-methyl-1-aziridinyl)phosphine oxide.
[c] 2,2,4,4,6,6-hexa(2-methyl-1-aziridinyl)2,4,6-triphospha-triazine.

In run number 1, 0.5 ml. of chromium naphthenate was added to catalyze the curing reaction. In each of the runs the mixture components were stirred on a stainless steel plate heated on a steam bath in the open. At the end of the curing reaction period, the mixture was cooled and a sample analyzed.

The results in the above table demonstrate that higher molecular weight products were produced by the procedure of this invention. Run 3 shows the production of an essentially completely crosslinked product by this invention.

Although this invention has been described in considerable detail, it should be understood that such detail is for the purpose of illustration only and that many variations and modifications can be made by one skilled in the art without departing from the scope and spirit thereof.

What is claimed is:

1. A cured ABC terpolymer composition wherein said terpolymer contains three different monomers in an essentially recurring sequence in at least 10 weight percent of said ABC terpolymer, wherein said three different monomers consist essentially of (I) an oxirane of the formula

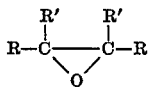

containing up to 20 carbon atoms wherein each R and R' is selected from the group consisting of hydrogen, saturated aliphatic, saturated cycloaliphatic, monoolefinic aliphatic, diolefinic aliphatic, monoolefinic cycloaliphatic, diolefinic cycloaliphatic, aromatic radicals, and combinations thereof; halogen-substituted members thereof; and members thereof containing oxygen in the form of an acyclic ether linkage (—O—), an oxirane group

or wherein both R' substituents taken together form a divalent aliphatic hydrocarbon radical bound to the carbon atoms of the oxirane group to form a cycloaliphatic nucleus containing from 4 to 10 carbon atoms;

(II) a cyclic acid anhydride containing up to 20 carbon atoms per molecule; and (III) a 1,3-epoxide or 1,4-epoxide, wherein said ABC terpolymer the mole ratio of said oxirane to said cyclic acid anhydride ranges from 0.6/1 to 1.4/1, and the mole ratio of said 1,3-epoxide or 1,4-epoxide to said cyclic acid anhydride ranges from 0.1/1 to 1/1; and wherein said ABC terpolymer has been cured by reaction with a polyfunctional compound selected from the group consisting of (A) a polyisocyanate represented by the formula R(NCO)$_m$ wherein R is an aliphatic, cycloaliphatic or aromatic polyvalent organic radical having from 2 to 30 carbon atoms and $m$ is the integer 2, 3 or 4;

(B) an aziridinyl compound represented by the formulas

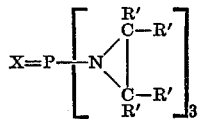

wherein X is oxygen or sulfur and each R' is hydrogen or alkyl, cycloalkyl or aryl or combinations thereof and the total R' groups of each aziridinyl group ranges up to 20 carbon atoms,

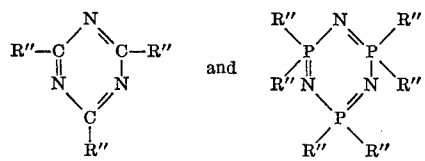

wherein each R" is a radical at least 2 of which in each formula are 1-aziridinyl radicals as defined above for the phosphine oxides and sulfides and the remainder are said 1-aziridinyl radicals, hydrogen, alkyl, cycloalkyl or aryl radicals or combinations thereof, each hydrocarbon radical having from 1 to 12 carbon atoms, or

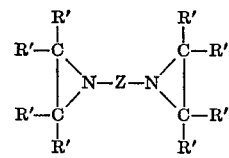

wherein Z is carbonyl, phenyl phosphoryl, phenyl thiophosphoryl, sulfoxyl or sulfonyl and each R' is as defined above; or (C) an epoxide containing at least 2 exopide

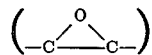

groups per molecule.

2. The terpolymer of claim 1 wherein each of said monomers in said terpolymer is present in essentially equimolar proportions in at least 50 weight percent of said terpolymer.

3. The terpolymer of claim 1 wherein each of said monomers in said terpolymer is present in essentially equimolar proportions.

4. The terpolymer of claim 1 wherein said oxirane is epichlorohydrin, said cyclic acid anhydride is phthalic anhydride; said 1,3-epoxide or 1,4-epoxide is tetrahydrofuran; and said polyfunctional compound is an epoxy resin having 2 epoxy groups per molecule, having an equivalent weight of 172–176, and having a molecular weight of about 380; tri(2-methyl-1-aziridinyl)phosphine oxide; or 2,2,4,4,6,6-hexa(2-methyl-1-aziridinyl)2,4,6 - triphosphatriazine.

References Cited
UNITED STATES PATENTS

| | | | |
|---|---|---|---|
| 3,337,511 | 8/1967 | Matsuura et al. | 260—78.4 EP |
| 3,464,958 | 9/1969 | Matsuura et al. | 260—78.4 EP |
| 3,375,227 | 3/1968 | Hicks | 260—856 |
| 3,427,255 | 2/1969 | Case | 260—78.4 EP |
| 3,661,865 | 5/1972 | Hsieh | 260—78.4 EP |
| 3,548,026 | 12/1970 | Weisfeld et al. | 260—835 |
| 3,213,067 | 10/1965 | Pohl et al. | 260—78.4 EP |
| 3,274,163 | 9/1966 | Elfers et al. | 260—78.4 EP |
| 3,382,217 | 5/1968 | Case | 260—78.4 EP |

JOHN C. BLEUTGE, Primary Examiner

U.S. Cl. X.R.

260—77.5 AT, 78 R, 78.4 EP, 78.4 R